UNITED STATES PATENT OFFICE.

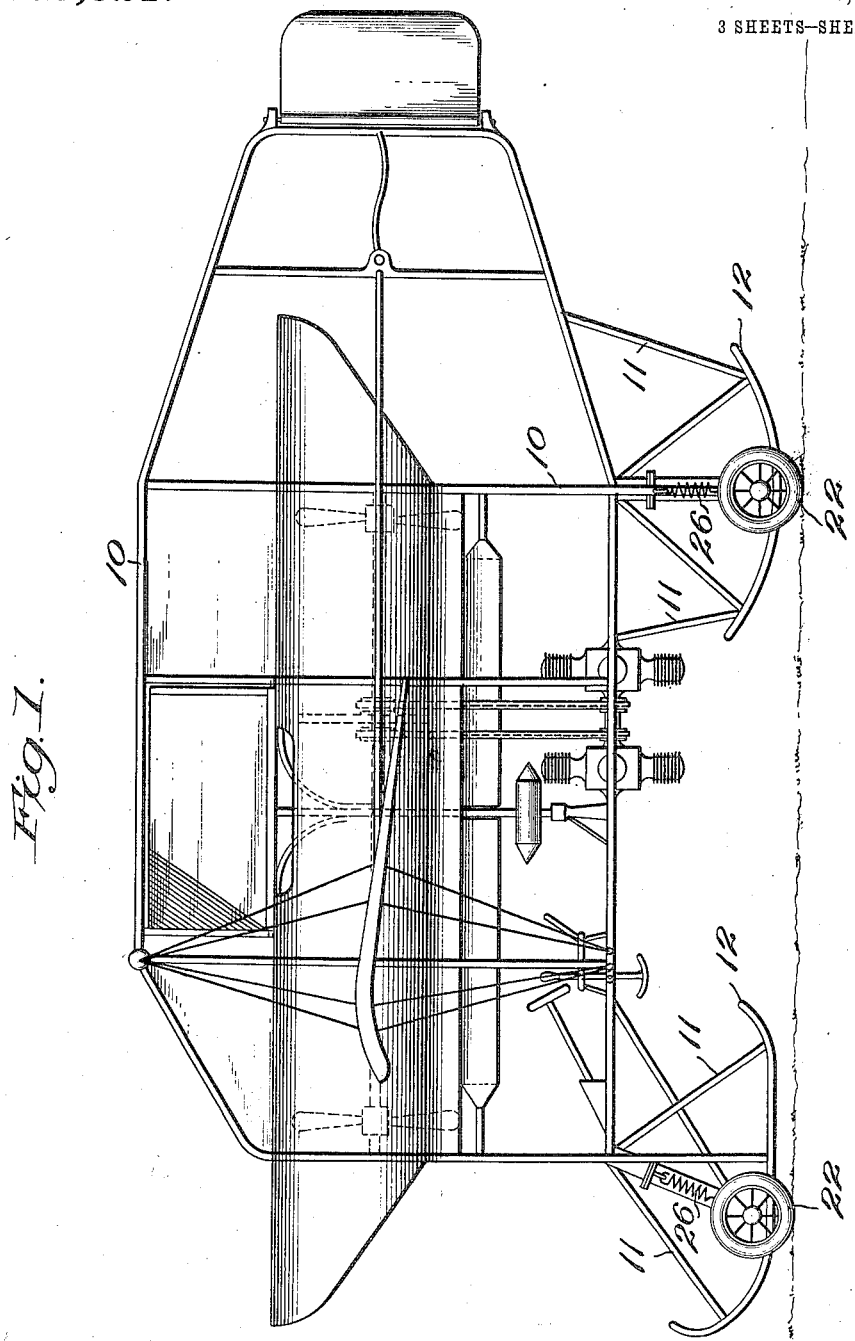

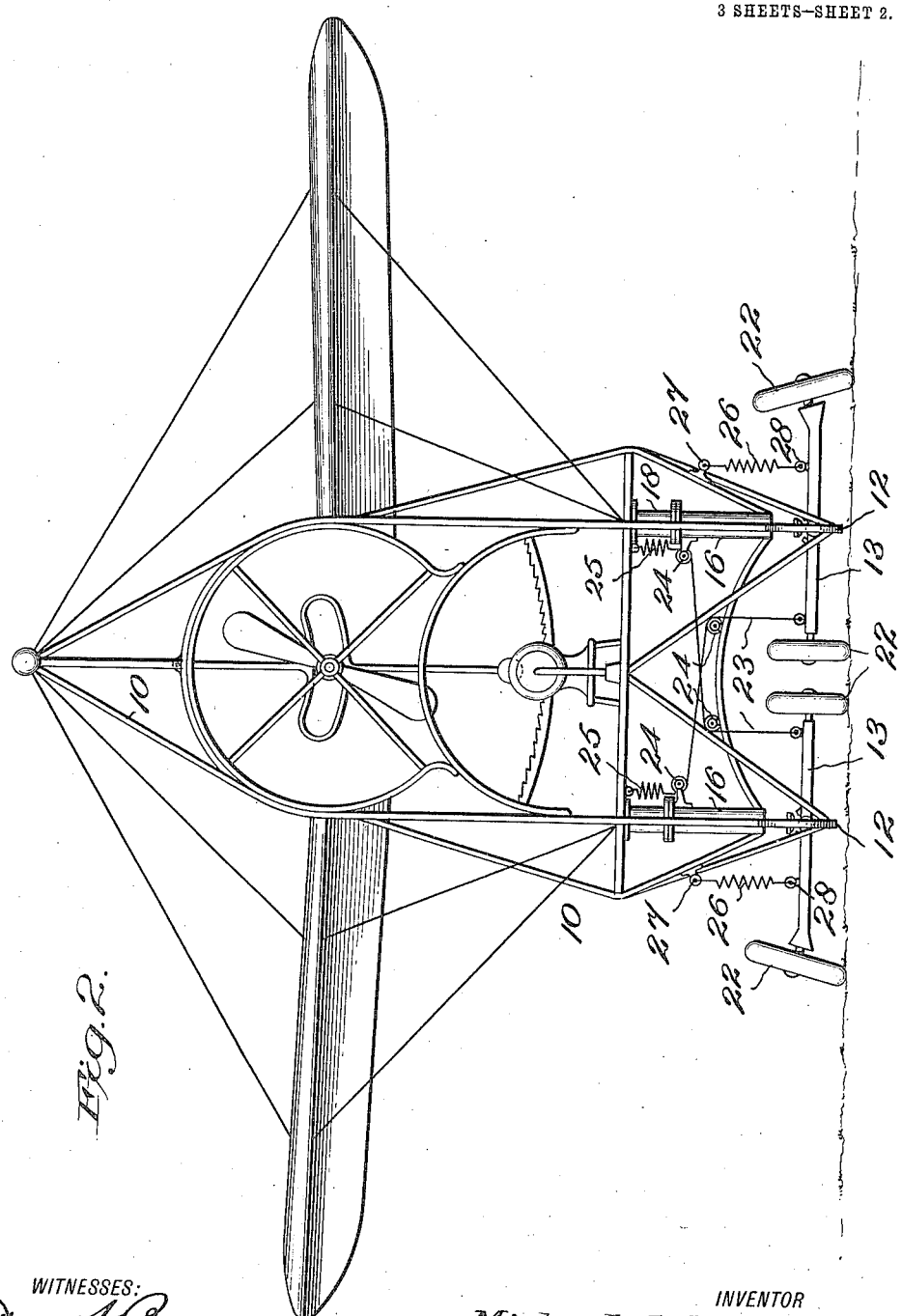

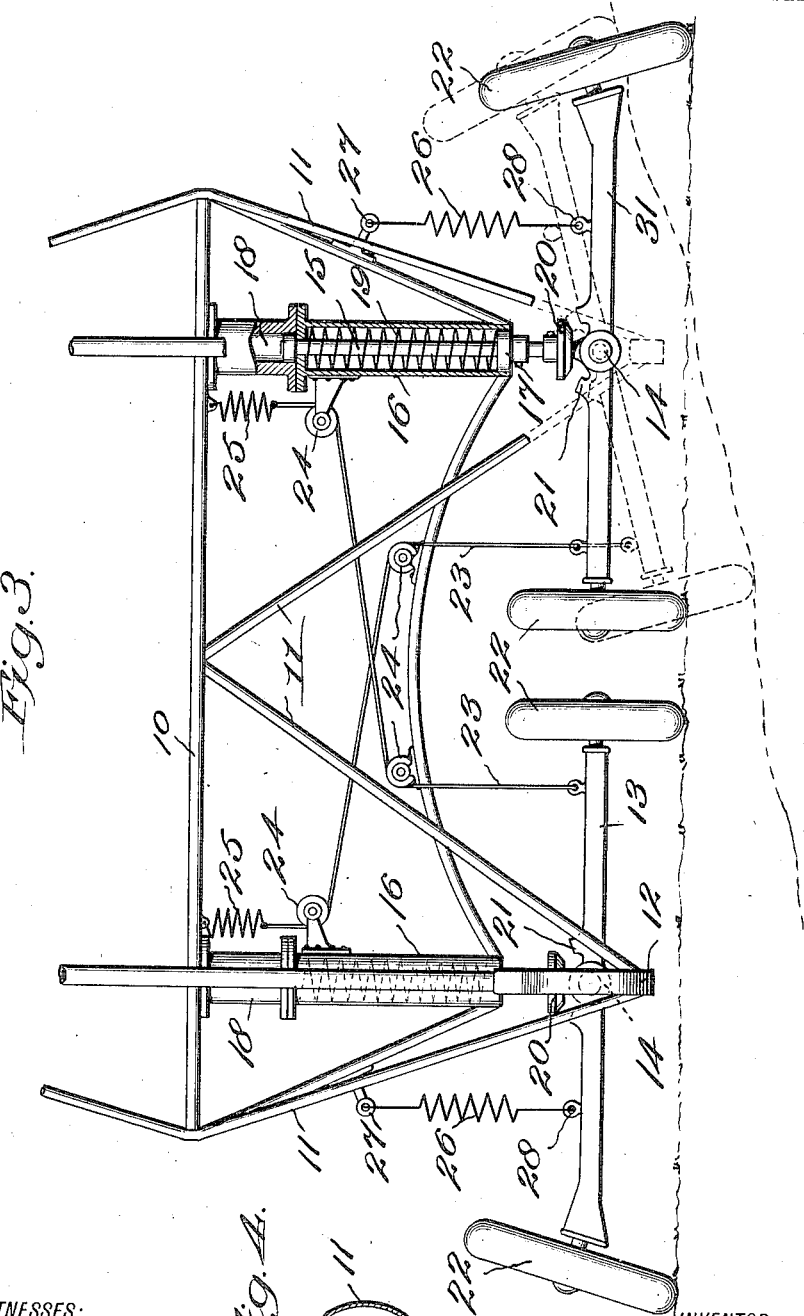

MICHAEL A. PARISANO, OF NEW YORK, N. Y.

RUNNING SUPPORT FOR FLYING-MACHINES.

1,049,521. Specification of Letters Patent. Patented Jan. 7, 1913.

Application filed December 21, 1911. Serial No. 667,155.

*To all whom it may concern:*

Be it known that I, MICHAEL A. PARISANO, a citizen of the United States, residing at New York, in the county of New York and State of New York, have invented certain new and useful Improvements in Running Supports for Flying-Machines; and I do hereby declare the following to be a full, clear, and exact description of the invention, such as will enable others skilled in the art to which it appertains to make and use the same.

My present invention has relation to an improved running support for flying machines of the heavier-than-air type.

In my U. S. Patent No. 987,596, granted to me March 21st 1911 I have described a form of yielding running support comprising wheels and skids so arranged that a flying machine, in descending to the ground, is received yieldingly, thereby avoiding shock.

My present invention has for its object an improvement over the running support described in my former patent aforesaid, whereby any unevenness in the ground is made harmless and danger of upsetting is obviated.

My invention also involves an arrangement for better receiving the sidewise impact to which machines of this kind are often subjected on striking the ground.

The invention is illustrated in a preferred form only in the accompanying drawings, wherein—

Figure 1 is a side view of one form of machine provided with my present improvement, Fig. 2 is a front view of the same, Fig. 3 is an enlarged front view of the running support partly in section, and Fig. 4 is a cross section of the bars preferably used in my frame.

The superstructure may be of any desired form appropriate to machines of this kind. The frame work 10 of the machine is provided with braces 11 supporting the usual skids 12, normally out of contact with the ground.

At each end of the machine I provide two trucks carrying each two wheels, and provided with suitable yielding supports. In the preferred form of my improvement which is shown in the drawings, each truck comprises a cross bar 13, pivoted at its middle or near it, as at 14, to a plunger 15, which enters and is guided within a sleeve 16, by a piston 17 or equivalent means. I also prefer to supply a guide for the inner end of the plunger 15, in the form, for instance, of a socket 18, wherein the plunger fits. Within the sleeve 16, a strong spiral spring 19, abutting upon the piston or collar 17, affords a yielding support for the truck. The degree of tilting of the cross bar 13 on its pivot 14 is preferably limited by a suitably shaped collar 20, on the plunger 15, said collar being preferably annular in form and presenting preferably a beveled bearing surface to the impact of suitable projections 21 on the cross bar, whereby the degree of tilting of such cross bar is limited as indicated in dotted lines in Fig. 3.

The supporting wheels 22 have suitable bearings at the outer ends of the cross bars 13, and I prefer to arrange each outer wheel on each cross bar or truck, so that its plane normally makes a distinct angle with the vertical, whereby the lower portion of the wheel is made to project outward. This arrangement insures a safe and secure resistance to the sidewise thrust to which these supporting wheels are very usually subjected in practice. Also I prefer to thicken or reinforce the outer extremity of each truck, as shown, to further provide against these expected shocks.

It is an important feature of my invention that I provide means whereby the tendency of machines of this kind to upset when landing upon a side hill or other uneven ground is automatically counteracted. For this purpose, the inner end of each tilting cross bar 13 is connected to one end of a cable or cord 23, which, after running over suitably placed pulleys 24, has its other end attached to a spring 25. By this means the inner end of each cross bar 13 is given an upward tendency, which is normally corrected, however by the springs 26 which are attached at 27 to the main frame and at 28 to the outer sides of all the cross bars 13. It will be seen that, in case of landing upon such a side hill as is indicated in dotted lines in Fig. 3, the canted or inclined outer wheel on the right side in that figure will first strike, and, on the cross bar 13 being tilted as shown, both wheels on the right hand truck will be on the ground. Under these conditions there would ordinarily be a strong tendency for the left side to rise, and for the machine to be tipped over toward the right. By the use of my invention, however, this tendency is counteracted, since the depression of the left side of the cross bar 13 at once transmits through the cord or cable 23 a strong pull to the spring 25. The effect of this operation is, of course to pull down the left side of the machine and prevent tipping over.

In Fig. 4 is shown a cross section of the form of bars which I prefer to use in constructing my framework and braces. In this figure a hollow or tubular bar is shown which is narrower in a direction across the machine than in the direction of movement of the device. A tube of this kind gives increased stiffness in the line of progress, and at the same time offers less resistance to passage through the air than ordinary round tubes or bars.

Various changes may be made in my machine without departing from the spirit of my invention and I am not to be understood as limiting myself to the details herein shown and described.

What I claim is—

1. In a flying machine, a main frame, trucks pivotally mounted on opposite sides thereof and adapted to swing transversely, and wheels at opposite ends of said trucks, substantially as described.

2. In a flying machine, a main frame, trucks pivotally mounted on opposite sides thereof and adapted to swing transversely, wheels at opposite ends of said trucks, and an independent yielding support between each truck and said main frame, substantially as described.

3. A running support for flying machines comprising in combination a truck pivoted so as to be tiltable transversely, wheels at opposite ends thereof and stops adapted to limit the degree of tilting of said truck, substantially as described.

4. A running support for flying machines comprising two trucks side by side pivotally mounted for lateral vibration at each end of the framework, and wheels at opposite ends of each truck, substantially as described.

5. A running support for flying machines comprising in combination a truck pivoted so as to be tiltable transversely, wheels on the opposite ends of said truck and springs connected with said truck on the opposite sides of its pivotal point, substantially as described.

6. A running support for flying machines comprising in combination a truck pivoted to one side of the framework so as to be tiltable transversely, a spring at the opposite side of the machine and a connection between the inner end of said truck and said spring, substantially as described.

7. A running support for flying machines comprising in combination a truck pivoted to one side of the framework so as to be tiltable transversely, a spring at the opposite side of the machine, a connection between the inner end of said truck and said spring, a spring at the same side of the framework as said truck and a connection between said latter spring and the outer end of said truck, substantially as described.

8. A running support for flying machines comprising in combination a sleeve, a plunger movable within the same, a truck pivoted on said plunger and a stop collar on said plunger adapted to limit the degree of tilting of said truck, substantially as described.

9. In a running support for flying machines, a tilting truck, a support to which the same is pivoted, a stop collar on said support and a projection on said truck adapted to abut against said collar, substantially as described.

10. In a running support for flying machines, a tilting truck, a support to which the same is pivoted, a stop collar on said support, a stop collar on said support having a beveled abutting face and projections on opposite sides of said truck adapted to make contact with said beveled face, substantially as described.

11. In a running support for flying machines, a tilting truck with wheels mounted under one side of the framework, a resilient cord connecting the inner end of said truck with the opposite side of the framework and a cord connecting the outer end of the truck with that side of the framework which carries said truck, substantially as described.

In testimony whereof, I affix my signature in presence of two witnesses.

MICHAEL A. PARISANO.

Witnesses:
  H. S. MacKaye,
  Katharine C. Mead.